United States Patent
De Luca et al.

(10) Patent No.: US 7,822,825 B2
(45) Date of Patent: Oct. 26, 2010

(54) DEVICE AND METHOD FOR CENTRALIZED DATA MANAGEMENT AND A ACCESS CONTROL TO DATABASES

(75) Inventors: Marco De Luca, Turin (IT); Roberto Pagnin, Turin (IT); Paolo Senesi, Turin (IT)

(73) Assignee: Telecom Italia S.p.A., Milan (IT)

( * ) Notice: Subject to any disclaimer, the term of this patent is extended or adjusted under 35 U.S.C. 154(b) by 1100 days.

(21) Appl. No.: 10/533,677

(22) PCT Filed: Nov. 15, 2002

(86) PCT No.: PCT/EP02/12816

§ 371 (c)(1), (2), (4) Date: Apr. 29, 2005

(87) PCT Pub. No.: WO2004/047399

PCT Pub. Date: Jun. 3, 2004

(65) Prior Publication Data

US 2006/0106936 A1    May 18, 2006

(51) Int. Cl.
*G06F 15/16* (2006.01)
(52) U.S. Cl. ............ 709/217; 709/218; 709/219; 709/229; 709/230
(58) Field of Classification Search ......... 709/217–219, 709/229–230
See application file for complete search history.

(56) References Cited

U.S. PATENT DOCUMENTS

| | | | |
|---|---|---|---|
| 6,085,197 A * | 7/2000 | Federighi et al. | 1/1 |
| 6,263,064 B1 | 7/2001 | O'Neal et al. | |
| 6,434,700 B1 * | 8/2002 | Alonso et al. | 713/169 |
| 2001/0016880 A1 * | 8/2001 | Cai et al. | 709/321 |
| 2002/0033416 A1 | 3/2002 | Gerszberg et al. | |
| 2002/0073066 A1 | 6/2002 | Coutts et al. | |
| 2002/0107985 A1 * | 8/2002 | Hwang et al. | 709/246 |
| 2002/0112009 A1 | 8/2002 | Capers et al. | |
| 2002/0120697 A1 | 8/2002 | Generous et al. | |
| 2002/0129153 A1 | 9/2002 | Fleming | |
| 2002/0143961 A1 * | 10/2002 | Siegel et al. | 709/229 |
| 2003/0065662 A1 * | 4/2003 | Cosic | 707/9 |

FOREIGN PATENT DOCUMENTS

WO    WO 02/059791 A1    8/2002

* cited by examiner

*Primary Examiner*—Nathan Flynn
*Assistant Examiner*—Jeong S Park
(74) *Attorney, Agent, or Firm*—Banner & Witcoff, Ltd.

(57) ABSTRACT

A profile access mediator provides to a plurality of service providers controlled and logically centralized access to personal profiles stored in a local or distributed database. The access to the databases containing user, service or terminal profiles is controlled and tracked by a plurality of personalized access technologies which are dependent on the typology of the data involved. Such a scheme allows for better control of the data access, more efficiency in the security and accounting processes, as well as in the data access in general.

22 Claims, 3 Drawing Sheets

DEVICE AND METHOD FOR CENTRALIZED DATA MANAGEMENT AND A ACCESS CONTROL TO DATABASES

CROSS REFERENCE TO RELATED APPLICATIONS

This application is the US national phase of PCT application PCT/EP2002/012816 filed 15 Nov. 2002 with a claim to the priority of PCT patent application PCT/EP2002/012816 itself filed 15 Nov. 2002.

FIELD OF THE INVENTION

The present invention refers to telecommunication systems and in particular to a device and a method for storing and controlling the access, from a plurality of remote entities within a multimedia and/or telecommunication service network, to a plurality of heterogeneous databases for storing user and service information.

In a telecommunication market which is every day more competitive, a winning element for a service provider is the ability to offer personalized services for final users. Users are expecting new services and applications and, even more important, new and user-friendly ways to access and use the telephony, internet and multimedia services.

BACKGROUND ART

In the present scenario, in which a multiplicity of services are offered by a plurality of service/content providers, the information relative to user, service and terminal profiles are spread over a great number of databases, and very often the same profile is doubled in two or even more distinct locations.

As an example, a user who subscribes a telephone service and an internet service (internet access, voice over IP, content access) has usually different profiles stored in different databases. In such a case the user profile is not unique, because is split at least in a "telephone profile" and an "internet profile", and in addition the distinct profiles reside on different database servers.

A typical situation in which a single user is associated to different profiles is shown in FIG. 1. Two different services, a telephone service 2 and an internet service 4 offer services to a single user, each service has a proprietary database for storing user profiles. A first database 6 is used by the telephone service 2 for storing a telephone profile, while a second database 8 is connected to the internet service 4 for storing an internet profile for the same user.

In a system configuration as the one shown in FIG. 1 it is not possible to assure the consistency and uniqueness of the information relative to a single user, in fact a user is unable to apply the same changes to both services, for example if he wishes to redirect calls to a particular terminal, for both traditional calls and VoIP sessions.

Therefore a change in the profile information must be replicated independently on both databases, either the change is made by a user or by a network/service administrator. Such a system is therefore not easy-to-use for single users and not easy-to-manage for network/service administrators.

Considering furthermore that the number of services offered is always increasing, especially in the field of multimedia and content delivery services, it is clear that any increase in the number of databases used for storing user, service or terminal profiles, introduces difficulties in managing correctly the corresponding information.

In US2002/0073066 is disclosed a data brokerage system for selling access to data, such as data stored in a data warehouse used for example by retailers or financial institutions to store transaction information, inventory information etc. The problems addressed in US2002/0073066 are mainly the necessity to offer differentiated views over data, to track accesses and to manage different kinds of data.

In the system disclosed in US2002/0073066 the management of data is assigned to a data warehouse having a rigid structure, wherein, for example, the access technologies are not customized for different typologies of data and the reading interfaces allow the access to a limited and predetermined subset of data.

The Applicant has tackled the problem of managing more efficiently the information relative to user, service and terminal profiles in a multimedia/telecommunication environment. In a system in which the number of services offered is constantly increasing and their nature changes very frequently, the new services must be highly personalized, both by the service provider (e.g. commercial offer, provisioning and assurance) and by the end user (e.g. subscription, configuration, access). To this purpose are very important the integration of internet applications with other services, such as next generation telephony, and innovative ways of handling user, terminal and service profiles and data within the network.

The Applicant observes that, in a next generation telecommunication network, most of the data relative to personal profiles is replicated in a large number of different databases. Such redundancy does not allow an end user, as well as a service/content provider, to manage such personal information in an efficient, secure and reliable way.

The Applicant is of the opinion that, for a better data management, most of the personal profiles needed in a multimedia/telecommunication network must be managed by a logically centralized management system. The personal profiles can anyway belong to different administrative domains.

In view of the above, it is an object of the invention to provide a device and a method for centrally managing personal profiles, assuring at the same time a high level of security as regards the access control to the databases containing such profiles in a telecommunication network.

SUMMARY OF THE INVENTION

According to the invention that object is achieved by means of a logically centralized system for managing the access, from remote entities within a telecommunication network supporting Voice over IP, multimedia and internet services, to heterogeneous profiles stored in both local or distributed databases. The access to the databases containing user, service or terminal profiles is controlled and tracked; a plurality of personalized access technologies are present which are dependent on the typology of the data involved. Such scheme allows a better control of the data access, more efficiency in the security and accounting processes, as well as in the data access in general. Moreover, in the system realized according to the invention, the external visibility of the profiles is personalized towards the typology of the request made by the remote entities and their privileges.

BRIEF DESCRIPTION OF THE DRAWINGS

The invention will now be described, by way of example only, with reference to the annexed figures of drawing, wherein.

DETAILED DESCRIPTION OF A PREFERRED EMBODIMENT OF THE INVENTION

Figure 1:
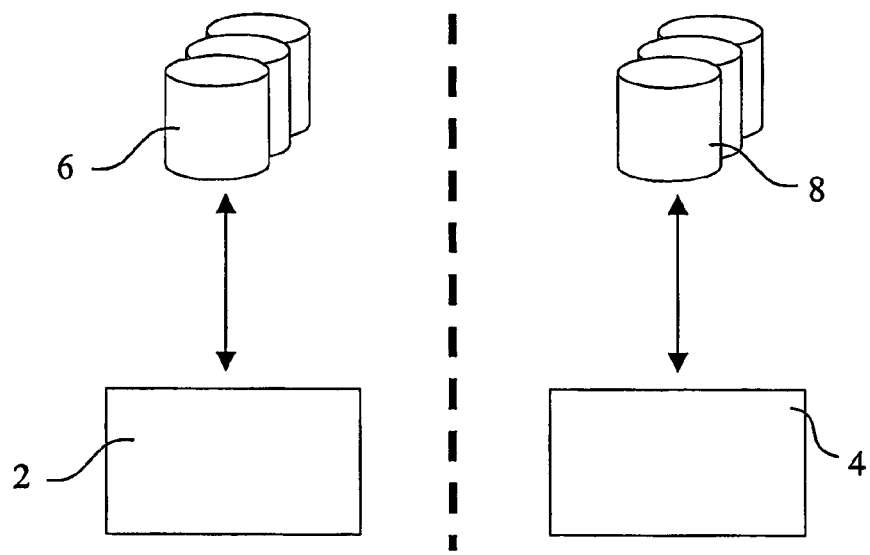
FIG. 1 is a block diagram of a prior art profile access management system.
Figure 2:
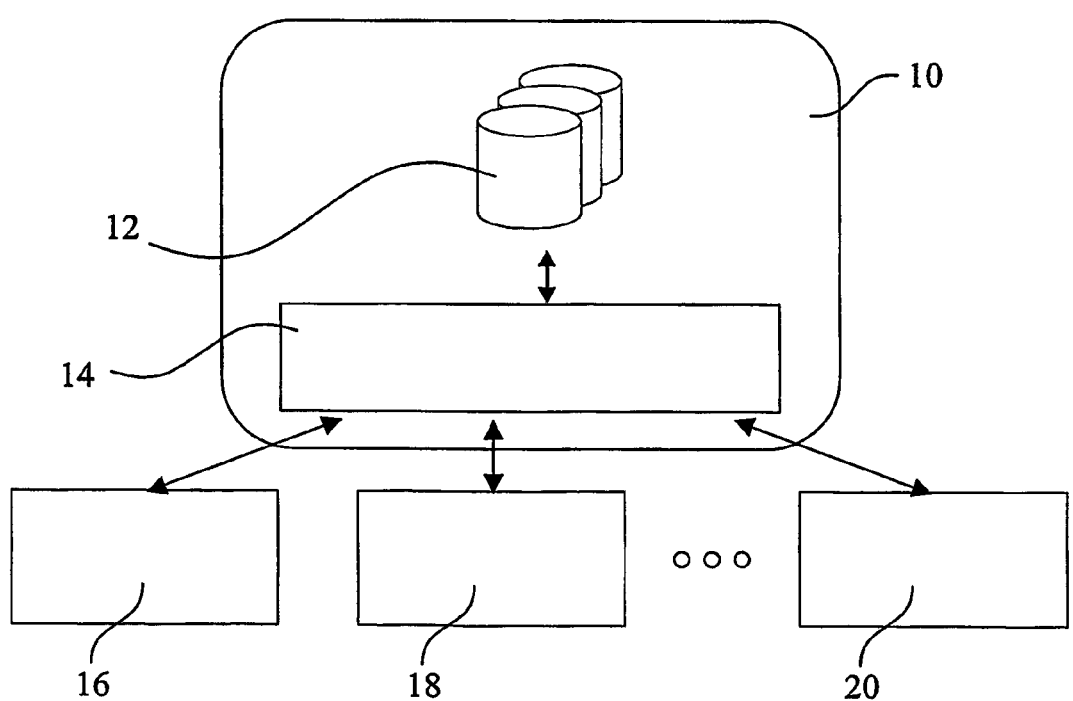
FIG. 2 is a schematic view of services interacting with a profile access mediator realized according to the present invention.

With reference to the block diagram of FIG. 2, a profile access mediator 10, realized according to the invention, provides to a plurality of service providers 16, 18, 20 a controlled and logically centralized access to personal profiles.

As shown in FIG. 2, a plurality of services, hereinafter referred to as "remote entities", for example a Voice over IP (VoIP) service 16, an Internet service 18 and a Multimedia service 20, interact with a single profile access mediator 10 for accessing various profiles logically centralized in a single directory server 12. All the accesses to the directory server 12 are handled by a plurality of interfaces, represented in figure by block 14, whose architecture will be disclosed in detail hereinafter with reference to FIG. 3.

The single profile access mediator 10 manages in a flexible way the information related to users, terminals and services, information globally referred to as "profiles", migrating them from service-specific network distributed databases to logically centralized repositories.

The use of logically centralized repositories enables the information consistency by having a unique repository, modified and read by different entities at any time. The profile access mediator 10 is a mediation device both for the access technology to the data (LDAP, RDBMS, XMLDB, etc.) and for administrative purposes (scalability, security, accountability, etc.).

Figure 3:
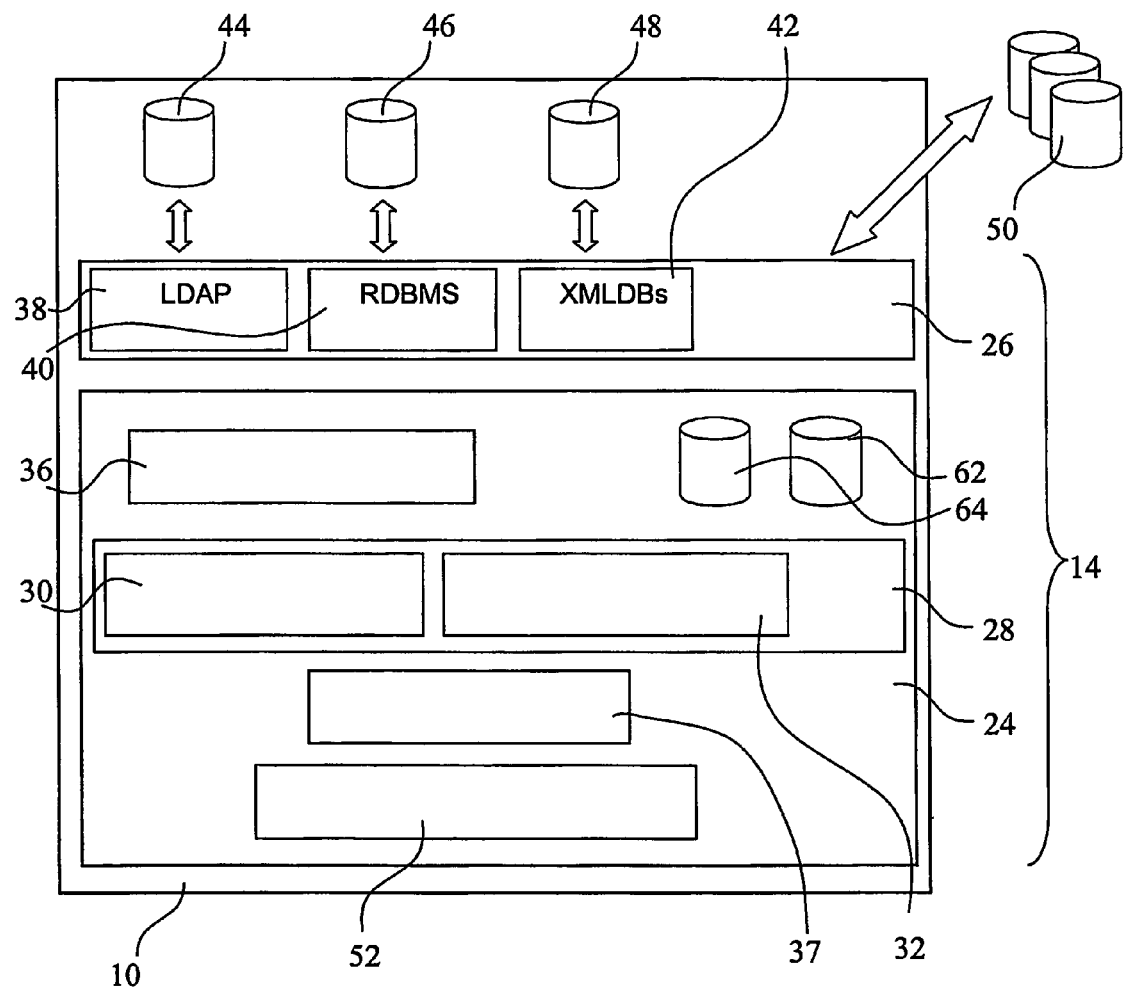
FIG. 3 is a detailed block diagram of a profile access mediator realized according to the present invention.

The block diagram of FIG. 3 is a detailed scheme of a profile access mediator 10 realized according to the invention, including a first plurality of databases 44, 46, 48 and a set of interfaces, referenced globally as 14, for managing and centrally controlling the access, from any of the remote entities 16, 18, 20 to the first plurality of databases 44, 46, 48 and to a second plurality of databases 50 external to the profile access mediator 10.

The first plurality of databases comprises User, Service and Terminal Profile Databases 44, containing personal information characterizing profiles of single users, information characterizing the configuration of services for different users, and the terminals used in the network by the users, Multimedia Accounting Databases 46 containing accounting information for multimedia services and Internet Accounting Databases 48 containing accounting information for Internet Services.

The second plurality of databases 50, situated in a logically or physically remote location relatively to profile access mediator 10, are capable of storing, for example, service profiles for services provided by third party service providers or information regarding user location for mobile services.

The set of interfaces 14 comprises two main blocks, a plurality of adapters 26 and a data provider 24.

The adapters 26 include a plurality of different adapters toward internal 44, 46, 48 and external databases 50, each adapter being able to manage a corresponding typology of database. Each adapter is customized for a particular typology of database, so that each access operation can be performed independently from the particular technology of a single database.

In FIG. 3 are represented three particular adapters, a LDAP adapter 38, a RDBMS adapter 40 and a XMLDBs adapter 42, nevertheless the number and nature of the adapters can vary and depends on the different typologies of the corresponding databases that the system has to manage.

The LDAP adapter 38 is developed for reading and writing profiles via LDAP protocol on Directory Server, for managing repositories that are particularly efficient in frequent accesses to small quantities of data.

The RDBMS adapter 40 is developed for managing Session Detail Records related to multimedia sessions.

The XMLDBs adapter 42 is developed for interfacing new generation XML databases for managing Session Detail Records related to internet sessions.

The data provider 24 is the block exposing access services to data (API) by means of remote interfaces, and includes the following basic blocks:

a plurality of application interfaces 28 (API) toward remote entities, each application interface being able to manage different mechanisms for accessing databases;

an Authentication unit 52;

an Authorization unit 37;

an Accounting/Security unit 36;

a Security Policy Repository 64 hosting information about security policies;

an Activity Log 62 hosting information about access tracking.

The application interfaces 28 (API) are the interfaces contacted by the remote entities 16, 18, 20 (client applications) for obtaining available services; the API can be classified in trusted application interfaces 30, in case the access is requested by authorized applications, and untrusted application interfaces 32, in case the access is requested by unknown applications.

The application interfaces 28 allows the access to databases 44, 46, 48 and 50 in read mode, write mode for entering new information, write mode for modifying existing information, write mode for deleting information and search mode.

The access to the application interfaces 28 (API) depends on a plurality of authorizations contained in an XML descriptor which allows or denies the use of the interfaces to the remote entities requesting access.

The application interfaces API 28 can be classified in:

read/search, concerning reading operations of data; the safety rules defined a priori influence the use of this kind of API from different users.

write, concerning writing operations of data; the safety rules defined a priori influence the use of this kind of API from different users.

creation of profiles, concerning writing operations of data; the safety rules defined a priori influence the use of this kind of API from different users, usually only the System Administrators are qualified for recalling such interfaces.

cancellation, concerning writing operations of data; the safety rules defined a priori influence the use of this kind of API from different users, in particular cases only the System Administrators are qualified for recalling such interfaces (e.g. cancellation of profiles).

The Authentication Unit 52 is in charge of recognizing the remote entities. The authentication functionalities are provided by the run-time environment.

The authorization unit 37 is in charge of authorizing the remote entities to use the adapters 26, by means of the verification of the essential requirements and the management of a corresponding authorization to use. The basic authorization functionalities are provided by the run-time environment, while extensions are needed towards more granular authorization mechanisms.

The Accounting unit 36 is in charge of tracking the accesses to internal 44, 46, 48 and external databases 50, by means of the registration, for each access, of information related to the identity of the remote entity that made the access, to the access times and to the data exchanged during the access; the information collected by the accounting unit 36 is useful for enforcing billing models.

The profile access mediator 10 comprises therefore two software layers 24 and 26 that allow to de-couple the application interfaces (API) and the interaction functionalities with data repositories, and offer a very good flexibility in interaction with different typologies of repositories.

The main functions of the profile access mediator 10 are:

Authentication, for identification of the remote entity connected to the mediator. This functionality uses the Java Authentication and Authorization Service (JAAS).

Authorization, for allowing or denying the use of specific available interfaces; the authorization is declarative and programmatic and is expressed by a file descriptor (XML descriptor) for the access policies to APIs.

Profile Reading, for partial or whole reading of a profile corresponding to one of the considered entities (user/terminal/service); the reading is made according to a method present in the adapter, with the assistance of the Java Naming and Directory Interface (JNDI) libraries implementing the LDAP protocol for accessing Directory Servers. If the profile is to be read on a RDBMS, the method sends an SQL query to the server by means of the database implemented according to Java Data Base Connectivity (JDBC) specifics.

Profile Creation or Deletion; the procedure is the same previously described for the "Profile Read" function;

Profile Modification; the procedure is the same previously described for the "Profile Read" function;

Search by keywords; if the search is made on a Directory Server, the method in charge of this operation arranges the search filter and calls the suitable JNDI method for directory query; if the search is made on RDBMS, the method charged with this operation receives the values needed for arranging the filter and passes it, as a parameter, to a JDBC method for the search on a relational database.

The profiles managed by the access mediator 10 are, for example:

User Profiles, containing personal information such as:
personal data (name, surname, date of birth, etc.) and personal account data (user-id, password, personal identifier);
personalization of the service environment, containing the list of the user terminals, the last IP terminal used by the user, the list of last called numbers and the list of subscribed services with corresponding utilization counters to trace the number of service accesses Service Profiles; every user is able to modify the personal profile relative to any subscribed service as regards its right to use.

Terminal Profiles, defining logically and physically each terminal recognized by the system as belonging to the domain; such profiles comprise two distinct branches separately stored in the Directory Server, general terminals and network connected terminals:
the general terminals branch contains the information relative to different types of hardware and software devices, according to technical (e.g. IP Phone having specific codecs) and product characteristics (specific model of a manufacturer);
the network connected terminals branch stores the information characterizing "logically" the device, as for example, the IP address for a IP Phone and a descriptive string.

Session Detail Records, defining the tracing of the multimedia sessions coming from and towards the user; they contain information such as start/end date/time of the session, caller and called ID, terminals ID, QoS information.

The profile access mediator 10 operates according to a method comprising the following steps:
receiving an access request from any of the remote entities 16, 18, 20;
authenticating the remote entity by means of the identification of the remote entity requesting the access;
providing a logically centralized access to the databases for storing personal profiles by means of a plurality of application interfaces 28 suitable for managing different mechanisms for accessing databases and by means of a plurality of adapters 26 toward the databases, each adapter being able to manage a corresponding typology of database;
tracking the access by means of the registration of information related to the identity of the remote entity that effected the access, the access time and the data exchanged during access.

Preferably, the step of authenticating the remote entity comprises authorizing the remote entity by means of the verification of essential requirements and the management of a corresponding authorization to use.

The profile access mediator 10 can be implemented as a computer program comprising computer program code means adapted to perform all the steps of the method above disclosed, when said program is run on a computer. The computer program is embodied on a computer readable medium.

Figure 4:
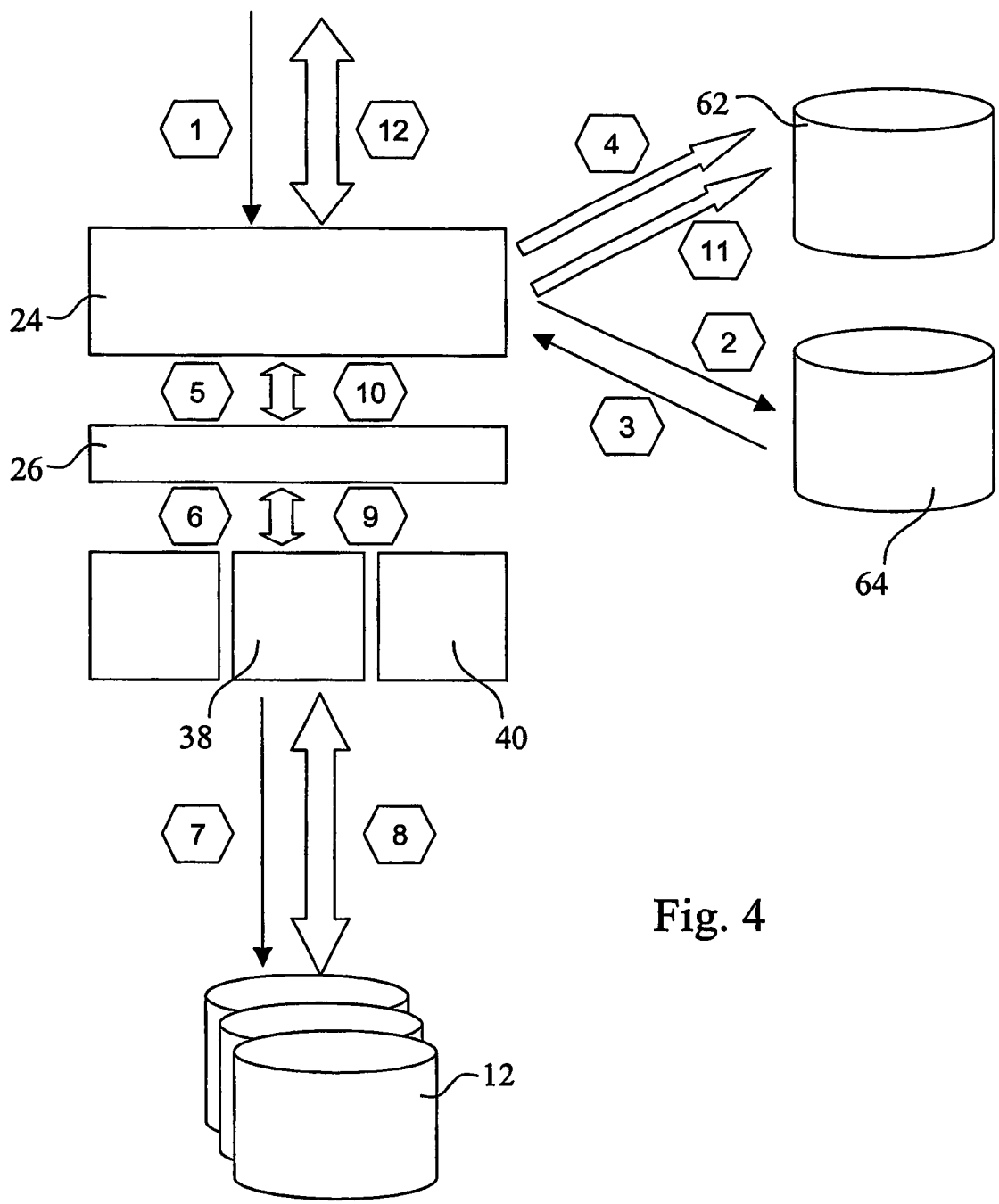
FIG. 4 is a diagram showing the interaction between different layers of a profile access mediator during a profile access operation.

The block diagram of FIG. 4 shows an example of interaction between different layers of a profile access mediator during a profile access operation. In particular the diagram refers to a reading request, performed by a user, of the latest called numbers.

The following operations correspond to the references <1> to <12> shown in FIG. 4:

<1> The Data Provider 24 of the Profile Access Mediator receives, from a client application, a reading request of a portion of a user profile, that is a method of a specific EJB is recalled;

<2> The Data Provider 24 verifies if the entity requesting the access is authorized, contacting the Security Policy Repository 64;

<3> The Data Provider 24 receives from the Security Policy Repository 64 the answer to previous request;

<4> The Data Provider 24 performs additional authorization tasks and records into the Activity Log 62 the accounting information;

<5> The interface side of the Adapter layer 26 receives the reading request from the Data Provider 24 and determines to which DAO class (Direct Access Object) the request is to be forwarded;

<6> The interface side with the data source of the Adapter layer 26 receives the reading request and forward it, by means of the JNDI libraries, to the Directory Server;

<7> The Directory Server 12 receives and processes the request;

<8>, <9>, <10> The data are forwarded to the client application that made the request, going back through layers up to the client application.

<11> The Data Provider 24 records into Activity Log 62 the normal or abnormal termination of the request <12> The data are forwarded to the client application that made the request, going back through layers up to the client application.

The invention claimed is:

1. A device configured to control access to databases storing personal profiles by a plurality of remote entities within a telecommunication network supporting a plurality of services, the device comprising:
a processor; and
memory operatively coupled to the processor and storing:
a first plurality of databases and interfaces for managing and centrally controlling access, from any of said remote entities to said first plurality of databases and to a second plurality of databases, wherein a first database of one of the first and second plurality of databases includes a first profile for a user and a second database of one of the first and second plurality of databases includes a second profile for the user, the first profile corresponding to a first service and the second profile corresponding to a second service different from the first service, and wherein said interfaces comprise:
a plurality of adapters configured to allow access to the first and second plurality of databases, wherein a first adapter of the plurality of adapters is customized to manage a first database typology and a second adapter, different from the first adapter, is customized to manage a second database typology different from the first database typology, the first database typology corresponding to the first database and the second database typology corresponding to the second database,
a plurality of application interfaces configured to allow access to the first and second plurality of databases by said plurality of remote entities and configured to manage different mechanisms for accessing databases,
an authentication unit configured to identify said remote entities,
an authorization unit configured to authorize said remote entities to use said adapters, by verifying essential requirements and the management of a corresponding authorization to use, and
an accounting unit configured to track the accesses to said first and second plurality of databases.

2. The device of claim 1, wherein the accounting unit tracks the accessing of the one or more first and second databases by registering each access of a database, information related to the identity of the remote entity that made the access, the access times and the data exchanged during access.

3. The device of claim 1, wherein the plurality of services comprises one of Voice over IP, multimedia and internet services.

4. The device of claim 1, wherein each of the plurality of adapters allows access to the plurality of first and second databases independently from a technology of the particular database.

5. The device of claim 1, wherein the access to the application interfaces corresponds to at least one of a plurality of authorizations contained in an XML descriptor.

6. The device of claim 1, wherein each of the interfaces allows access to one of the plurality of first and second databases via one of a trusted application interface and an untrusted application interface, wherein the trusted application interface is used when access is requested by an authorized application, and wherein the untrusted application interface is used when access is requested by an unknown application.

7. The device of claim 6, wherein each of the interfaces allows access to one of the plurality of first and second databases in a read mode.

8. The device of claim 6, wherein each of the interfaces allows access to one of the plurality of first and second databases in a write mode for entering new information.

9. The device of claim 6, wherein each of the interfaces allows access to one of the plurality of first and second databases in a write mode for modifying existing information.

10. The device of claim 6, wherein each of the interfaces allows access to one of the plurality of first and second databases in a search mode.

11. The device of claim 1, wherein each of the plurality of first databases includes user profile information.

12. The device of claim 11, wherein the user profile comprises one or more of: identity data, personal data, preference data, subscribed services and used terminal data.

13. The device of claim 1, wherein the plurality of first databases includes service profile information.

14. The device of claim 13, wherein the service profile comprises information corresponding to the configuration of services for each user.

15. The device of claim 1, wherein the plurality of first databases includes information corresponding to one or more terminals used in the multimedia and the telecommunication service networks.

16. The device of claim 15, wherein the information corresponding to the one or more terminals is stored in a generic terminal profile database, and a network terminal profile database, wherein the generic terminal profile database stores information relative to static characteristics of terminals and the network terminal profile database stores information relative to dynamic characteristics of terminals.

17. The device of claim 1, wherein the second plurality of databases is located separately from the device.

18. The device of claim 1, wherein the first adapter is customized to manage only the first database typology and the second adapter is customized to manage only the second database typology.

19. A method of providing a plurality of remote entities access to plurality of databases storing personal profiles within a telecommunication network supporting at least one of: Voice over IP, multimedia services and internet services, and for controlling said access, the method comprising:
receiving, by an access management system, an access request from a remote entity of said remote entities;
authenticating, by the access management system, said remote entity by identifying the remote entity requesting access;
providing logically centralized access to said databases for storing personal profiles by a plurality of application interfaces configured to manage different mechanisms for accessing the databases and by a plurality of adapters configured to allow access to said databases, each adapter configured to manage a corresponding database typology, wherein a first adapter of the plurality of adapters is customized to manage a first database typology of a first database storing a first user profile of the user and a second adapter, different from the first adapter, is customized to manage a second database typology different from the first database typology, wherein the second database typology corresponds to a second database storing a second user profile of the user, wherein the first and second user profiles correspond to different services; and tracking said access by registering information related to the identity of the remote entity that effected the access.

20. The method as claimed in claim 19, wherein tracking said access comprises collecting information corresponding to access time and data exchanged during the access.

21. The method as claimed in claim 19, wherein authenticating said remote entity comprises authorizing said remote entity by verifying essential requirements and management of a corresponding authorization to use.

22. A non-transitory computer readable storage medium having computer executable instructions stored thereon, that when executed by a computer perform a method of providing a plurality of remote entities access to one or more databases for storing personal profiles within a telecommunication network supporting at least one of: Voice over IP, multimedia services and internet services, and for controlling said access, the method comprising:

receiving an access request from any of said remote entities;

authenticating said remote entity by identifying the remote entity requesting access;

providing logically centralized access to said databases for storing personal profiles by a plurality of application interfaces configured to manage different mechanisms for accessing databases and by a plurality of adapters configured to allow access to said databases, each adapter configured to manage a corresponding database typology of a first database storing a first user profile for the user, wherein a first adapter of the plurality of adapters is customized to manage a first database typology and a second adapter, different from the first adapter, is customized to manage a second database typology different from the first database typology, wherein the second database typology corresponds to a second database storing a second user profile for the user, the first and second user profiles corresponding to different services; and tracking said access by registering information related to the identity of the remote entity that effected the access.

* * * * *